United States Patent
Ogawa (10) Patent No.: US 10,805,486 B2
(45) Date of Patent: Oct. 13, 2020

(54) REMOTE MANAGEMENT SYSTEM THAT DISPLAYS INPUT SCREEN ACCORDING TO DROP IN COMMUNICATION SPEED

(71) Applicant: KYOCERA Document Solutions Inc., Osaka (JP)

(72) Inventor: Tomohiro Ogawa, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/561,532

(22) Filed: Sep. 5, 2019

(65) Prior Publication Data
US 2020/0106903 A1    Apr. 2, 2020

(30) Foreign Application Priority Data
Oct. 1, 2018 (JP) ................................ 2018-186793

(51) Int. Cl.
*G06F 15/00* (2006.01)
*H04N 1/00* (2006.01)
*H04N 1/32* (2006.01)

(52) U.S. Cl.
CPC ..... *H04N 1/00501* (2013.01); *H04N 1/00344* (2013.01); *H04N 1/00506* (2013.01); *H04N 1/32678* (2013.01); *H04N 2201/0094* (2013.01)

(58) Field of Classification Search
CPC ........... H04N 1/00501; H04N 1/00344; H04N 1/32678; H04N 2201/0094; H04N 1/00506
USPC ..................................................... 358/1.14
See application file for complete search history.

(56) References Cited

U.S. PATENT DOCUMENTS

| | | | | |
|---|---|---|---|---|
| 2005/0280857 A1* | 12/2005 | Sugiyama | .......... | H04N 1/00238 358/1.13 |
| 2011/0181536 A1* | 7/2011 | Yoshihara | ............... | G06F 3/045 345/173 |
| 2013/0329253 A1* | 12/2013 | Sasaki | ................ | H04N 1/00408 358/1.15 |
| 2017/0155795 A1* | 6/2017 | Taira | .................... | H04N 1/0001 |

FOREIGN PATENT DOCUMENTS

JP        2007-133709 A        5/2007

* cited by examiner

*Primary Examiner* — Mark R Milia
(74) *Attorney, Agent, or Firm* — IP Business Solutions, LLC (57) ABSTRACT

A remote management system includes an information processing apparatus and an electronic apparatus. A second controller of the information processing apparatus detects communication speed between the information processing apparatus and the electronic apparatus, and transmits, when the communication speed drops to a predetermined level, a second instruction for reducing a data amount of a first input screen, from a second communication device to the electronic apparatus. A first controller of the electronic apparatus reduces the data amount of the first input screen to a predetermined amount, when a first communication device receives the second instruction, and transmits a second input screen having the reduced data amount, from the first communication device to the information processing apparatus. The second controller causes, when the second communication device receives the second input screen transmitted from the electronic apparatus, a second display device to display the second input screen received.

9 Claims, 9 Drawing Sheets

| TEXT TXA ON INPUT SCREEN OF IMAGE FORMING APPARATUS | TEXT TXB ON INPUT SCREEN BASED ON SCREEN DATA WITH REDUCED DATA AMOUNT |
|---|---|
| 送信 | そうしん |
| 言語選択 | げんごせんたく |
| …… | …… |
|  |  |

DT

REMOTE MANAGEMENT SYSTEM THAT DISPLAYS INPUT SCREEN ACCORDING TO DROP IN COMMUNICATION SPEED

INCORPORATION BY REFERENCE

This application claims priority to Japanese Patent Application No. 2018-186793 filed on Oct. 1, 2018, the entire contents of which are incorporated by reference herein.

BACKGROUND

The present disclosure relates to a remote management system including an information processing apparatus connected to an electronic apparatus via a network, and in particular to a technique to cope with a malfunction originating from a drop in communication speed in the network.

In existing systems in which, as is widely known, an information processing apparatus is connected to an electronic apparatus via a network, a technique is employed including transmitting an input screen displayed on a display device of the electronic apparatus, to the information processing apparatus via the network, to allow the input screen to be displayed on a display device of the information processing apparatus, and remotely operating the electronic apparatus from the information processing apparatus via the network, according to an instruction inputted through the input screen displayed on the display device of the information processing apparatus.

Further, the existing systems are given a function to store the data being displayed on the screen of the object apparatus while the object apparatus is executing an information processing program, in the operating apparatus. In case that the network is interrupted or disconnected, the stored display data is reproduced on the screen of the operating apparatus, and memorandum data is generated by accepting a temporary operation or input made on the screen of the operating apparatus. When the connection of the network is restored, the operating apparatus transmits the memorandum data to the object apparatus, to thereby support the object apparatus in continuing with the operation according to the information processing program, on the basis of the memorandum data.

SUMMARY

The disclosure proposes further improvements of the foregoing technique.

In an aspect, the disclosure provides a remote management system including an information processing apparatus, and an electronic apparatus connected to the information processing apparatus via a network. The electronic apparatus includes a first display device, a first control device, and a first communication device. The first control device includes a first processor, and is configured to act, when the first processor executes a control program, as a first controller that causes the first display device to display a first input screen for inputting a first instruction related to control of the electronic apparatus. The first communication device performs data communication with the information processing apparatus, via the network. The first controller transmits the first input screen from the first communication device to the information processing apparatus, and executes, upon receipt of the first instruction with respect to the first input screen transmitted from the information processing apparatus, received through the first communication device, an operation according to the first instruction. The information processing apparatus includes a second display device, a second communication device, an operation device, and a second control device. The second communication device performs data communication with the electronic apparatus, via the network. The operation device is operated by a manager. The second control device includes a second processor, and is configured to act, when the second processor executes an operation control program, as a second controller that causes, when the second communication device receives the first input screen transmitted from the electronic apparatus, the second display device to display the first input screen received, and, when the first instruction with respect to the first input screen is inputted through the operation device, transmits from the second communication device to the electronic apparatus, the first instruction inputted. The second controller detects communication speed between the information processing apparatus and the electronic apparatus, and transmits, when the detected communication speed drops to a predetermined level, a second instruction for reducing a data amount of the first input screen, from the second communication device to the electronic apparatus. The first controller of the electronic apparatus reduces the data amount of the first input screen displayed on the first display device to a predetermined amount, when the first communication device receives the second instruction, and transmits a second input screen having the reduced data amount, from the first communication device to the information processing apparatus. The second controller of the information processing apparatus causes, when the second communication device receives the second input screen transmitted from the electronic apparatus, the second display device to display the second input screen received.

DETAILED DESCRIPTION

Hereafter, a remote management system according to an embodiment of the disclosure will be described, with reference to the drawings.

Figure 1:
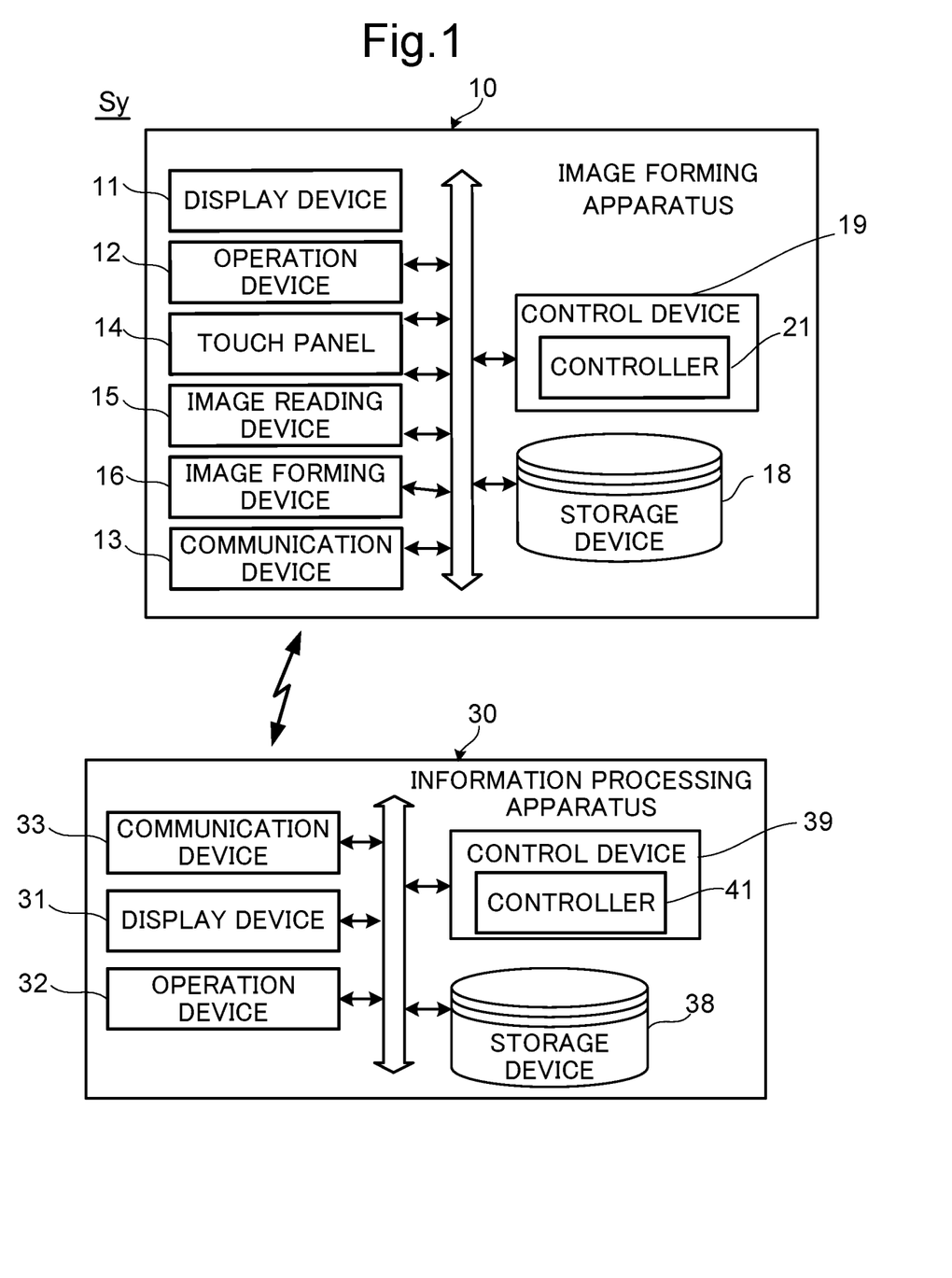
FIG. 1 is a block diagram showing a configuration of an image forming apparatus and an information processing apparatus, constituting a remote management system according to an embodiment of the disclosure.

FIG. 1 is a block diagram showing a configuration of the remote management system according to the embodiment of the disclosure. The remote management system Sy according to this embodiment includes an image forming apparatus 10, and an information processing apparatus 30 connected to the image forming apparatus 10 via a network (e.g., intranet).

In the remote management system Sy, the image forming apparatus 10 is a multifunction peripheral configured to execute a plurality of functions including, for example, a copying function, a printing function, and a scanning function. The image forming apparatus 10 includes a display device 11, an operation device 12, a communication device 13, a touch panel 14, an image reading device 15, an image forming device 16, a control device 19, and a storage device 18. The mentioned components are configured to transmit and receive data or signals to and from each other, via a bus.

The image reading device 15 and the image forming device 16 will be subsequently described in detail.

The display device 11 includes, for example, a liquid crystal display (LCD) or an organic light-emitting diode (OLED) display.

The operation device 12 includes hard keys such as a tenkey, an enter key, and a start key.

The touch panel 14 is overlaid on the screen of the display device 11. The touch panel 14 is configured to detect a contact (touch) of the user's finger, along with the touched position, thereby receiving an instruction from the user inputted through the screen of the display device 11. Accordingly, the touch panel 14 serves as an operation device for inputting the user's operation through the screen of the display device 11.

The communication device 13 is a communication interface including a communication module such as a local area network (LAN) chip. The communication device 13 is connected to the information processing apparatus 30 via a network (e.g., intranet), and performs data communication with the information processing device 30.

The storage device 18 is a large-capacity storage medium such as a solid state drive (SSD) or a hard disk drive (HDD), and contains various data and programs.

The control device 19 includes a processor, a random-access memory (RAM), a read-only memory (ROM), and so forth. The processor is, for example, a central processing unit (CPU), an application specific integrated circuit (ASIC), a micro processing unit (MPU), or the like. The control device 19 acts as a controller 21, when the processor executes a control program stored in the ROM or the storage device 18.

The controller 21 serves to control the overall operation of the image forming apparatus 10. The control device 19 is connected to the display device 11, the operation device 12, the communication device 13, the touch panel 14, the image reading device 15, the image forming device 16, and the storage device 18. The controller 21 controls the mentioned components, as well as the transmission and reception of signals or data among those components.

The controller 21 also acts as a processor to execute various operations. The controller 21 is configured to control the display device 11 and the communication device 13.

In the remote management system Sy, the information processing apparatus 30 is for example a personal computer, including a display device 31, an operation device 32, a communication device 33, a storage device 38, and a control device 39. The mentioned components are configured to transmit and receive data or signals to and from each other, via a bus.

The display device 31 includes, for example, a liquid crystal display or an organic light-emitting diode display.

The operation device 32 includes a keyboard and a pointing device to be operated by the user.

The communication device 33 is a communication interface connected to the image forming apparatus 10 via a network (e.g., intranet), and configured to transmit and receive data to and from the image forming apparatus 10.

The storage device 38 is a large-capacity storage medium such as a SSD or a HDD, and contains various application programs and various types of information.

The control device 39 includes a processor, a RAM a ROM, and so forth. The control device 39 acts as a controller 41, when the processor executes an operation control program stored in the ROM or the storage device 38.

The controller 41 serves to control the overall operation of the information processing apparatus 30. The control device 39 is connected to the display device 31, the operation device 32, the communication device 33, and the storage device 38. The controller 41 controls the mentioned components, as well as the transmission and reception of signals or data among those components.

The controller 41 also acts as a processor to execute operations according to instructions inputted through the operation device 32. The controller 41 is configured to control the display device 31 and the communication device 33.

Figure 2:
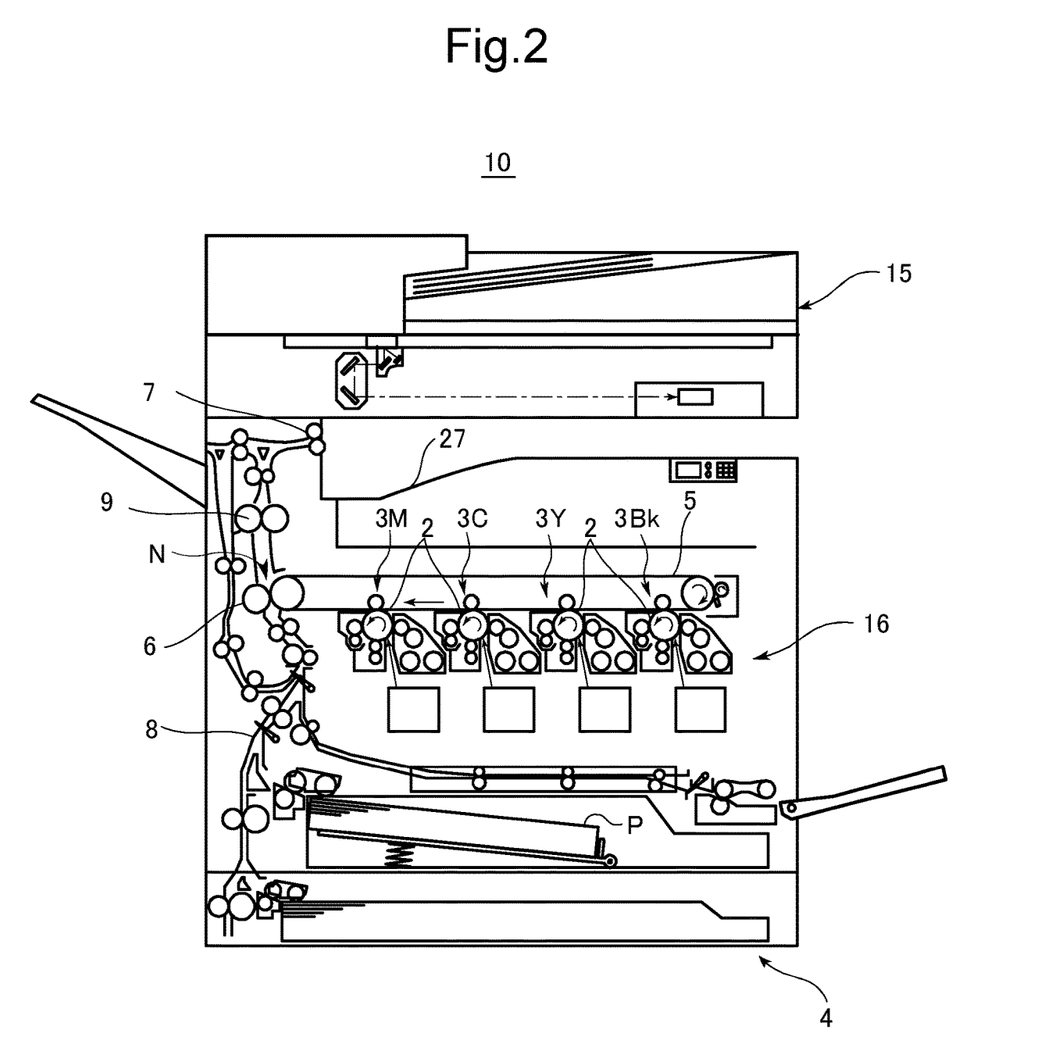
FIG. 2 is a cross-sectional view of the image forming apparatus according to the embodiment.

FIG. 2 is a cross-sectional view of the image forming apparatus 10. The image forming apparatus 10 includes an image reading device 15 and an image forming device 16.

The image reading device 15 includes an image pickup device that optically reads the image of a source document. The analog output from the image pickup device is converted into a digital signal, from which image data constituting the source document image is generated.

The image forming device 16 is configured to print an image based on the image data on a recording sheet, and includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 2 is uniformly charged, and an electrostatic latent image is formed on the surface of the photoconductor drum 2 by exposure. Then the electrostatic latent image on the surface of the photoconductor drum 2 is developed into a toner image, and the toner image on the photoconductor drum 2 is transferred to an intermediate transfer roller 5, as primary transfer. Thus, the color toner image is formed on the intermediate transfer roller 5. The color toner image is transferred, as secondary transfer, to the recording sheet P transported along a transport route 8 from a paper feed unit 4, at a nip region N defined between the intermediate transfer roller 5 and a secondary transfer roller 6.

Thereafter, the recording sheet P is press-heated in a fixing device 9, so that the toner image on the recording sheet P is fixed by thermal compression, and then the recording sheet P is discharged to an output tray 27 through a discharge roller pair 7.

In the remote management system Sy configured as above, the image forming apparatus 10 and the information processing apparatus 30 each operate independently. The image forming apparatus 10 operates according to inputs made by the user through the operation device 12 or the touch panel 14.

The user (hereinafter, manager) of the information processing apparatus 30 can remotely operate the image forming apparatus 10, by logging in in the image forming apparatus 10 from the information processing apparatus 30, via the network. The information processing apparatus 30 includes an application program for remotely operating the image forming apparatus 10, as one of the operation control programs. The controller 41 executes processes necessary for the remote operation of the image forming apparatus 10, by operating according to the application program.

During the remote operation, the controller 21 of the image forming apparatus 10 transmits first screen data of a first input screen (e.g., graphical user interface (GUI)) displayed on the display device 11 to the information processing apparatus 30 via the network, from the communication device 13. In the information processing apparatus 30, when the communication device 33 receives the first screen data, the first input screen based on the first screen data is displayed on the display device 31. When a first instruction related to the control of the image forming apparatus 10 is inputted to the first input screen through the operation device 32, while the first input screen is being displayed, the controller 41 transmits the first instruction from the communication device 33 to the image forming apparatus 10, via the network. In the image forming apparatus 10, when the communication device 13 receives the first instruction with respect to the first input screen, the controller 21 executes the operation according to the first instruction. Examples of the operation according to the first instruction include inputting of various setting values for the first input screen, transition to a next input screen, and execution of the copying function. Therefore, the manager of the information processing apparatus 30 can input the first instruction to the first input screen, thereby causing the image forming apparatus 10 to execute the operation according to the first instruction, by operating the operation device 32, with the first input screen on the part of the image forming apparatus 10 displayed on the display device 31 of the information processing apparatus 30.

However, in case that the communication speed of the network is low, the communication time necessary for the transmission of the first screen data of the first input screen through the network is prolonged, and therefore the information processing apparatus 30 may fail to acquire sufficient data for displaying the first input screen, thus failing to display the first input screen, which results in a delay of the remote operation. Here, the first screen data refers to image data.

In this embodiment, therefore, the controller 41 of the information processing apparatus 30 detects the communication speed of the network, and transmits, when the detected communication speed is low, a second instruction for reducing the data amount of the first input screen, from the communication device 33 to the image forming apparatus 10, via the network. In the image forming apparatus 10, when the communication device 13 receives the second instruction, the controller 21 reduces the amount of the first screen data constituting the first input screen displayed on the display device 11, and transmits second screen data for a second input screen, generated by reducing the amount of the first screen data, from the communication device 13 to the information processing apparatus 30. Accordingly, the communication time of the input screen can be prevented from being excessively prolonged, and the delay of the remote operation can be prevented. Here, the second screen data refers to image data.

Figure 3:
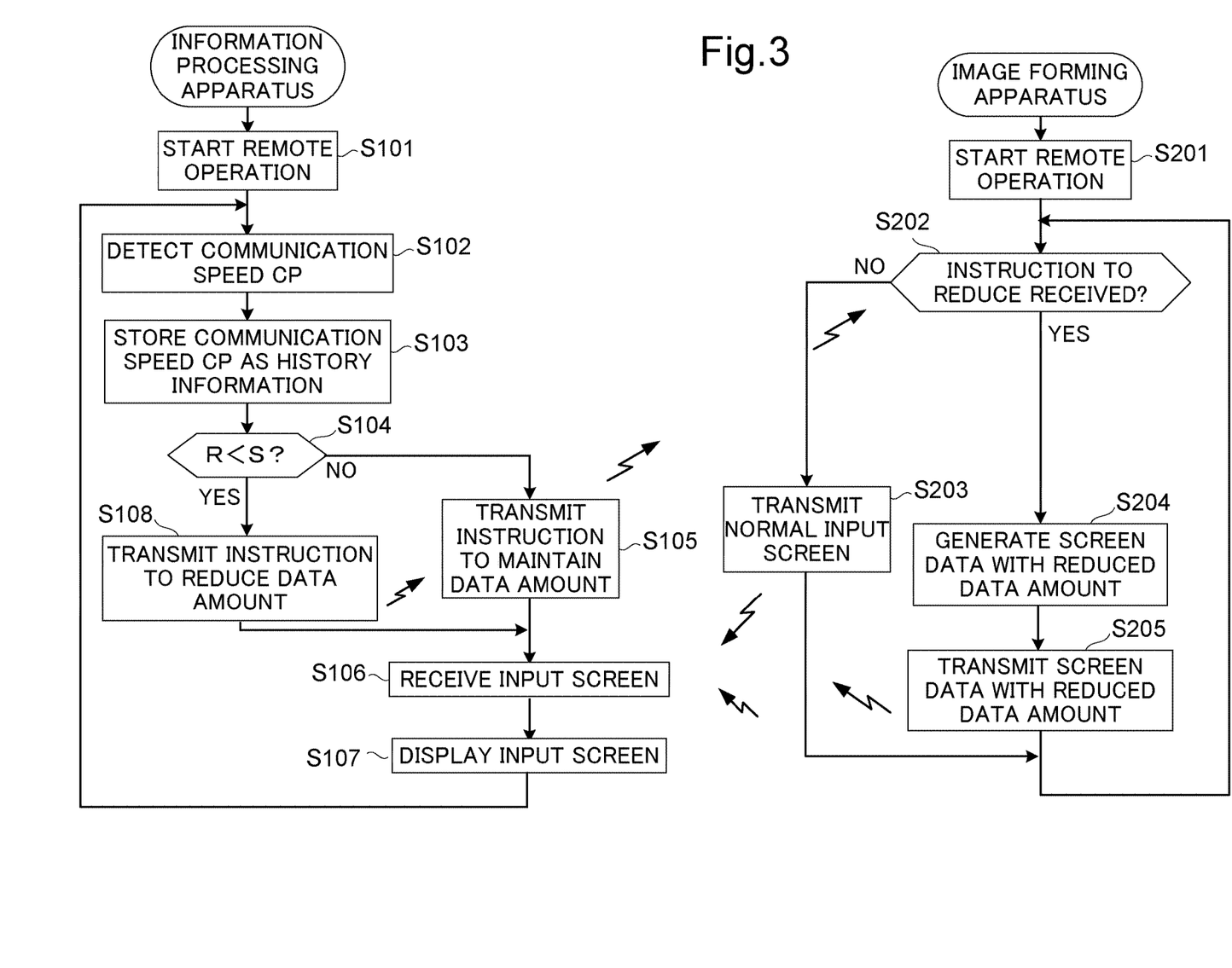
FIG. 3 is a flowchart showing a process for remotely operating the image forming apparatus from the information processing apparatus, according to a first embodiment.

Hereunder, a first embodiment of the process for remotely operating the image forming apparatus 10 from the information processing apparatus 30 will be described in detail, with reference to the flowchart shown in FIG. 3.

In the information processing apparatus 30, when the manager inputs an instruction to start the remote operation through the operation device 32, controller 41 controls the communication device 33 so as to start data communication between the information processing apparatus 30 and the image forming apparatus 10. When the manager inputs, for example, a log-in password through the operation device 32, the controller 41 of the information processing apparatus 30 transmits the log-in password from the communication device 33 to the image forming apparatus 10, via the network. When the communication device 13 of the image forming apparatus 10 receives the log-in password, and the controller 21 of the image forming apparatus 10 authenticates the log-in password, the remote operation through a remote panel is started (step S101, step S201).

When the remote operation by the information processing apparatus 30 with respect to the image forming apparatus 10 is started, the controller 41 of the information processing apparatus 30 detects a communication speed CP between the information processing apparatus 30 and the image forming apparatus 10 (step S102). For example, known packet capture software may be stored in the storage device 38, and the controller 41 may execute the packet capture software to monitor a software port employed for the data communication for the remote operation, thus detecting the communication speed CP between the information processing apparatus 30 and the image forming apparatus 10.

The controller 41 stores the detected communication speed CP in the storage device 38, as history information (step S103). Preferably, the history information of the communication speed CP may be detected and stored in the storage device 38, not only from the data communication for the ongoing remote operation, but also from the data communication for a preceding remote operation, and from the data communication between the information processing apparatus 30 and another image forming apparatus 10. In addition, the image forming apparatus 10 may be remotely operated by a plurality of information processing apparatuses 30. When a plurality of information processing apparatuses 30 remotely operate the image forming apparatus 10, the communication speed CP between the information processing apparatus 30 and the image forming apparatus 10 is detected with respect to each of the information processing apparatuses 30, and the data of the communication speed CP thus detected is stored in the storage device 38, as the history information.

The controller 41 calculates an average speed CPA of the communication speed CP, on the basis of the history information of the communication speed CP stored in the storage device 38, and a ratio R of the current communication speed CP, detected at step S102, to the average speed CPA, and decides whether the ratio R is lower than a predetermined threshold S (step S104).

For example, upon deciding that the ratio R is not lower than the threshold S (No at step S104), the controller 41 construes that the communication speed CP is not so low as to provoke a delay of the remote operation, and transmits a third instruction for maintaining the amount of the first screen data constituting the first input screen, from the communication device 33 to the image forming apparatus 10 (step S105).

In the image forming apparatus 10, the communication device 13 receives the third instruction to maintain the amount of the first screen data constituting the first input screen (No at step S202), and the controller 21 transmits the first screen data for the first input screen from the communication device 13 to the information processing apparatus 30 via the network, without reducing the amount of the first screen data constituting the first input screen displayed on the display device 11 (step S203).

Figure 4A:
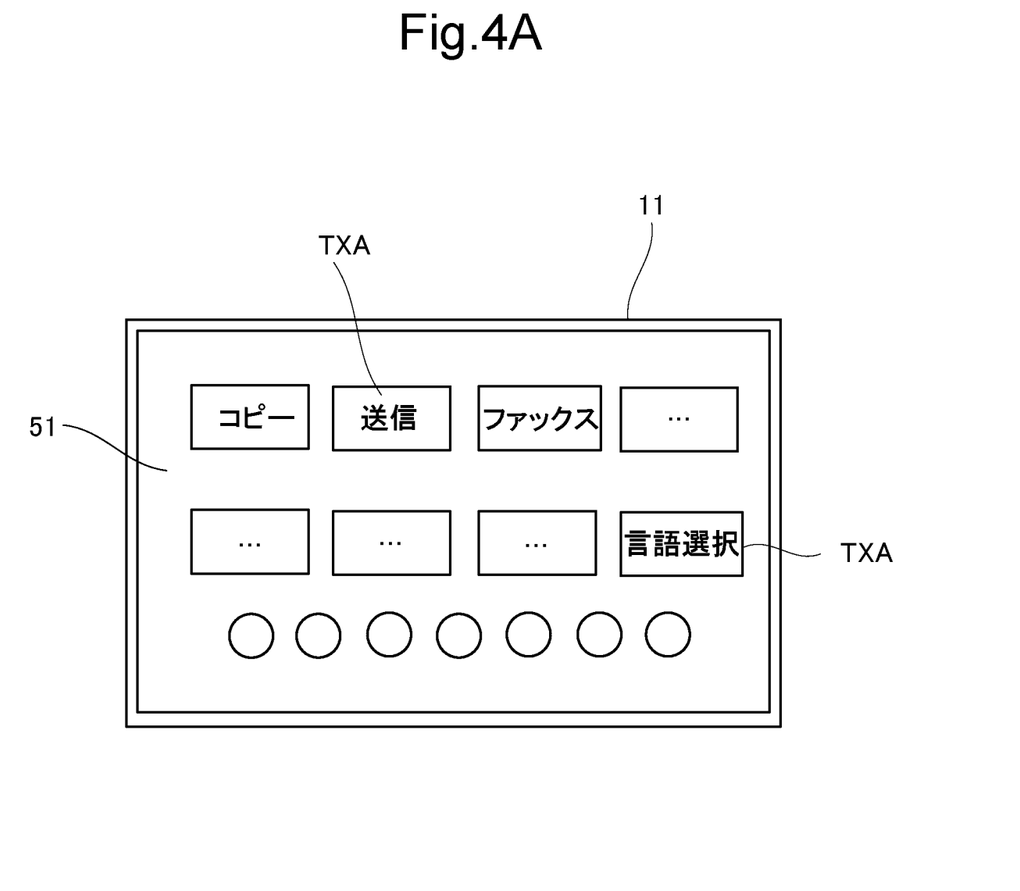
FIG. 4A is a schematic drawing showing an input screen displayed on a display device of the image forming apparatus.

In the information processing apparatus 30, when the communication device 33 receives the first screen data for the first input screen (step S106), the controller 41 causes the display device 31 to display the first input screen (step S107). For example, when a first input screen 51 shown in FIG. 4A is displayed as GUI on the display device 11 of the image forming apparatus 10, the identical first input screen 51 is also displayed on the display device 31 of the information processing apparatus 30.

When the manager inputs the first instruction with respect to the first input screen 51 through the operation device 32, with the identical first input screen 51 being displayed on both of the display device 31 of the information processing apparatus 30 and the display device 11 of the image forming apparatus 10, the controller 41 of the information processing apparatus 30 transmits the position on the first input screen 51 corresponding to the first instruction, from the communication device 33 to the image forming apparatus 10. In the image forming apparatus 10, when the communication device 13 receives the coordinate position on the first input screen 51, the controller 21 identifies the operation to be performed with respect to the coordinate position on the first input screen 51, and executes the operation identified.

In the case where the controller 41 of the information processing apparatus 30 decides that the ratio R is lower than the threshold S, when the communication between the information processing apparatus 30 and the image forming apparatus 10 is started, or during the transmission of the first screen data (Yes at step S104), the controller 41 decides that the communication speed CP has dropped to such an extent as to cause a delay of the remote operation, and transmits the second instruction to reduce the data amount of the first input screen, from the communication device 33 to the image forming apparatus 10, via the network (step S108).

In the image forming apparatus 10, when the communication device 13 receives the second instruction to reduce the data amount of the first input screen (Yes at step S202), the controller 21 generates second screen data, by reducing the data amount to a predetermined amount (step S204).

Figure 4B:
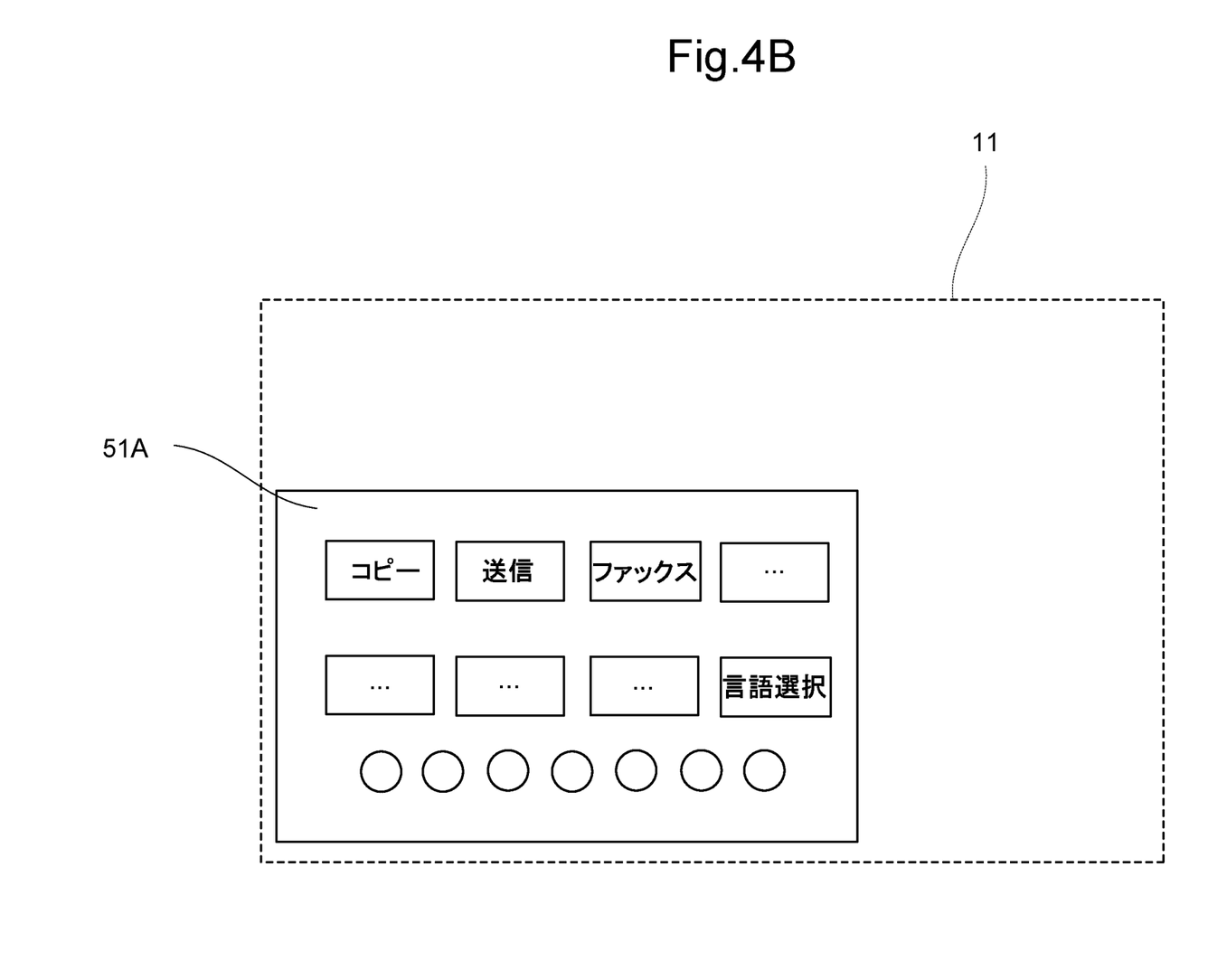
FIG. 4B is a schematic drawing showing an example of a smaller-sized input screen.

For example as shown in FIG. 4B, the controller 21 generates the second screen data for a second input screen 51A, by reducing the first screen data for the first input screen supposed to be displayed on the display device 11, to a predetermined smaller size (e.g., to a size corresponding to 70% in area, compared with the original first input screen). Alternatively, when the first screen data for the first input screen, supposed to be displayed on the display device 11, represents a color image, the controller 21 may generate the second screen data for the second input screen, by converting the first input screen into an image in gray scale. In this case, the data amount of the first input screen converted into the image in gray scale corresponds to an example of the predetermined smaller size.

Upon generating the second screen data having the reduced data amount, the controller 21 transmits the second screen data, having the data amount reduced as above, from the communication device 13 to the information processing apparatus 30, via the network (step S205).

When the communication device 33 of the information processing apparatus 30 receives the second screen data having the reduced data amount (step S106), the controller 41 causes the display device 31 to display the second input screen 51A based on the second screen data (step S107).

Now, during the remote operation between an information processing apparatus and an electronic apparatus via a network in an existing system, the communication speed of the network may significantly drop, though not to such an extent as to cause interruption or disconnection of the network. In such a case, the communication time of the input screen through the network is prolonged, and a delay is incurred in the remote operation. As a result, the remote operation may be disabled.

On the basis of known techniques, for example, memorandum data may be generated from inputs made on the screen of the information processing apparatus, when the communication speed of the network significantly drops, so that, when the communication speed of the network recovers, the memorandum data may be transmitted from the information processing apparatus to the electronic apparatus, to support the electronic apparatus in continuing with the ongoing operation, according to the memorandum data. However, such a procedure is complicated, and the remote operation is unable to be recovered from the delay.

With the arrangement according to the first embodiment, in contrast, the second screen data generated by reducing the data amount of the first screen data for the first input screen can be transmitted without delay, from the image forming apparatus 10 to the information processing apparatus 30, despite the communication speed of the network between the information processing apparatus 30 and the image forming apparatus 10 having dropped, so that the second input screen based on the second screen data can be displayed without delay, on the part of the information processing apparatus 30. Therefore, the remote operation by the information processing apparatus 30 with respect to the image forming apparatus 10 can be prevented from being delayed.

Figure 5:
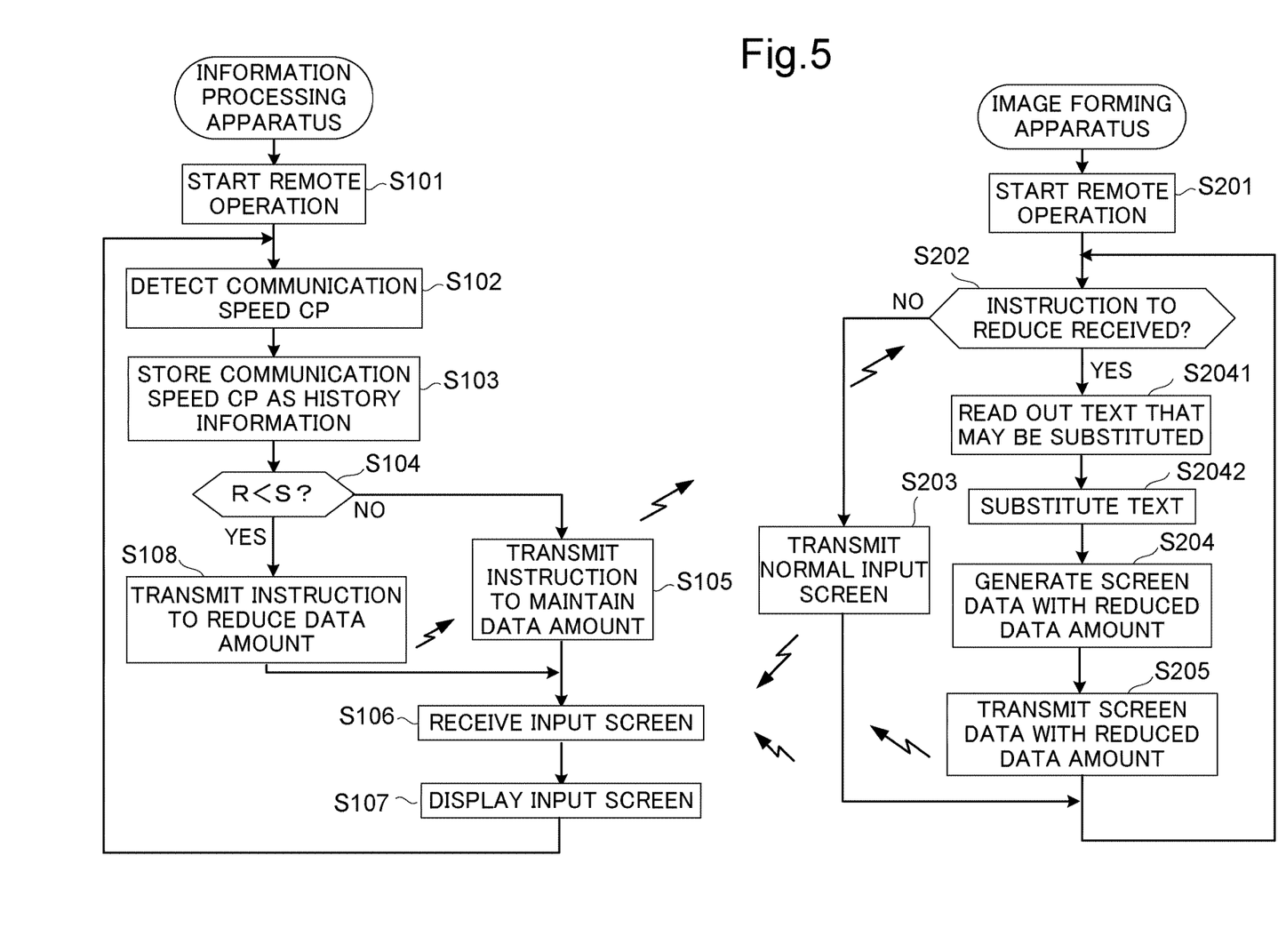
FIG. 5 is a flowchart showing a process for remotely operating the image forming apparatus from the information processing apparatus, according to a second embodiment.

Referring now to the flowchart shown in FIG. 5, a second embodiment of the process for remotely operating the image forming apparatus 10 from the information processing apparatus 30 will be described. In the description of the second embodiment, the same steps as those of the first embodiment will be omitted.

In the second embodiment, a data table, in which icons, keys, and texts to constitute the first input screen are registered, is stored in advance in the storage device 18, with respect to each type of the first input screen. The controller 21 looks up the data table, to extract the text for the first input screen 51. In addition, a text table DT containing, for example as shown in FIG. 6, texts TXA for the first input screen 51, and texts TXB each having a data amount reduced from the first screen data for the second input screen, is stored in advance in the storage device 18, the texts TXB being respectively associated with the texts TXA.

Figure 6:
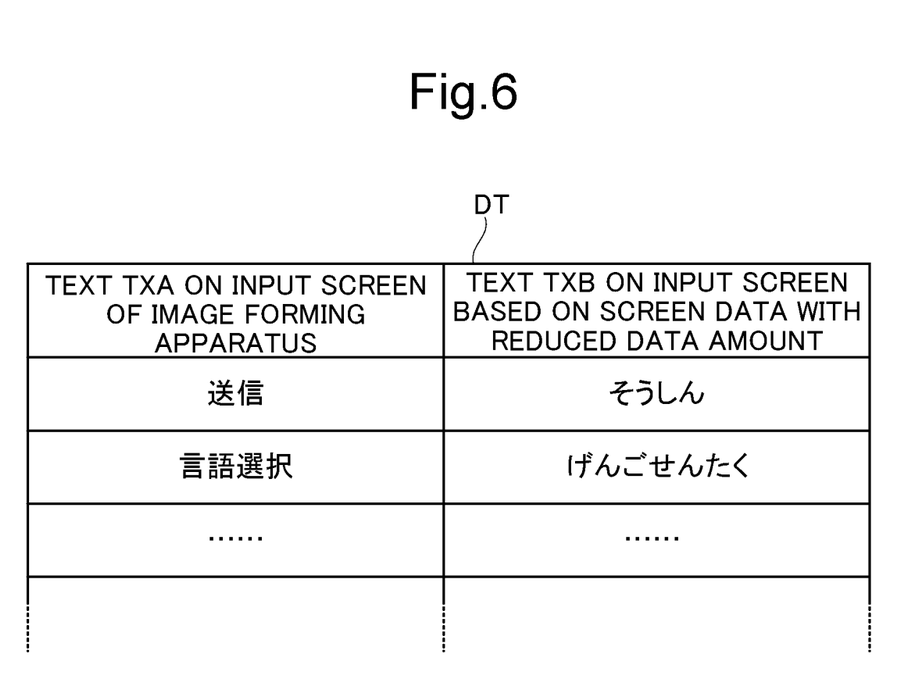
FIG. 6 is a schematic drawing conceptually showing a text table containing texts on the input screen displayed on the display device of the image forming apparatus, in association with the texts on the input screen of low resolution, displayed on the display device of the information processing apparatus.
Figure 7A:
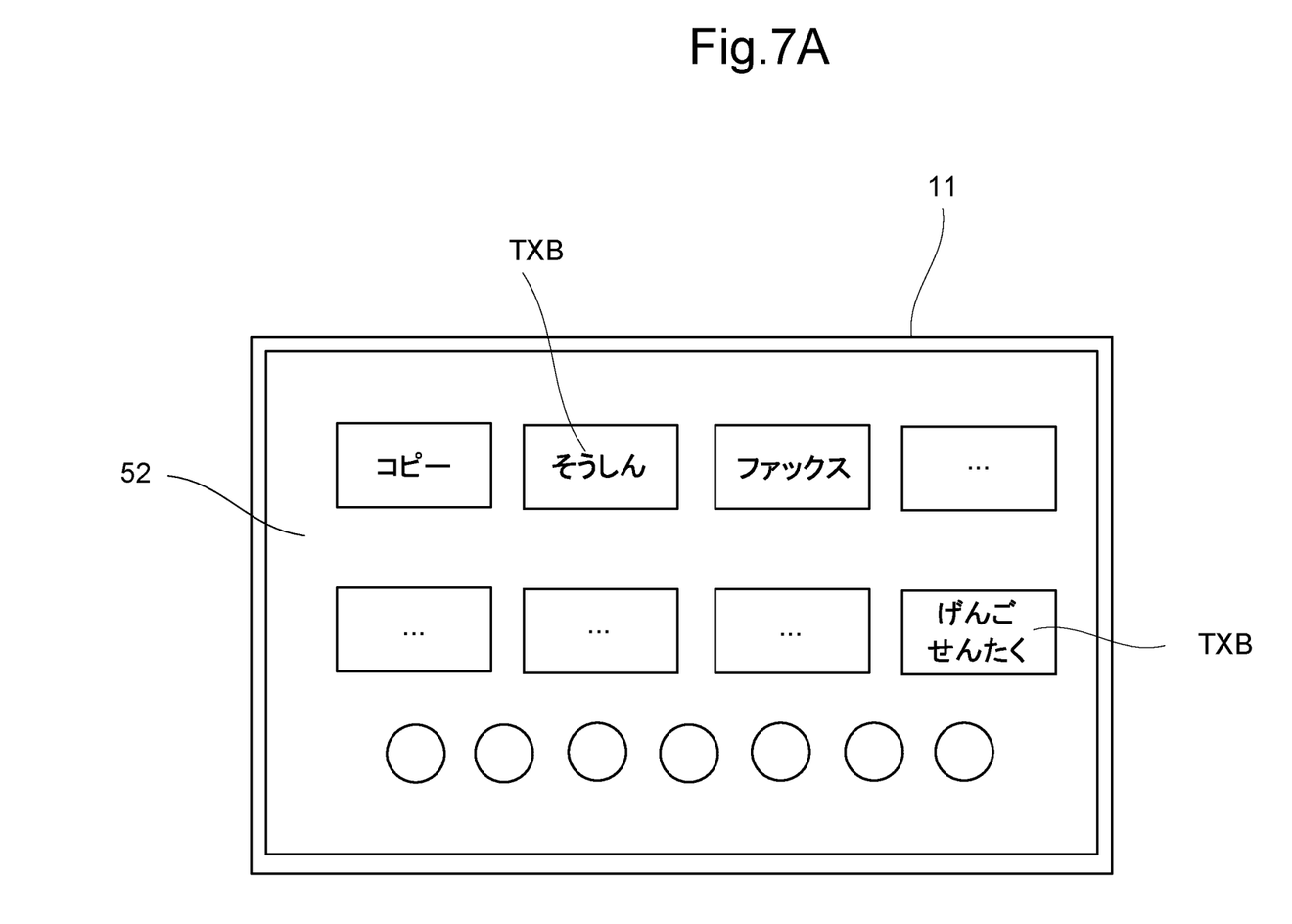
FIG. 7A is a schematic drawing showing the input screen displayed on the display device of the image forming apparatus, on which kanji characters have been substituted with kana letters.

In the second embodiment, the controller 21 looks up the text table DT, when generating the second screen data for the second input screen of the predetermined smaller size, by reducing the data amount, to acquire the texts TXB respectively associated with the texts TXA extracted from the first input screen 51 (step S2041), and substitutes the extracted texts TXA with the texts TXB (step S2042), thereby generating the second screen data for the second input screen 52, as the example shown in FIG. 7A. The controller 21 then generates the second screen data for a second input screen 53, as the example shown in FIG. 7B, by converting the second input screen 52 into a screen of the predetermined smaller size (step S204).

Here, in the text table DT shown in FIG. 6, the texts TXA are composed of kanji characters, and the texts TXB are composed of kana letters only. The kana letters may be either hiragana or katakana.

Figure 7B:
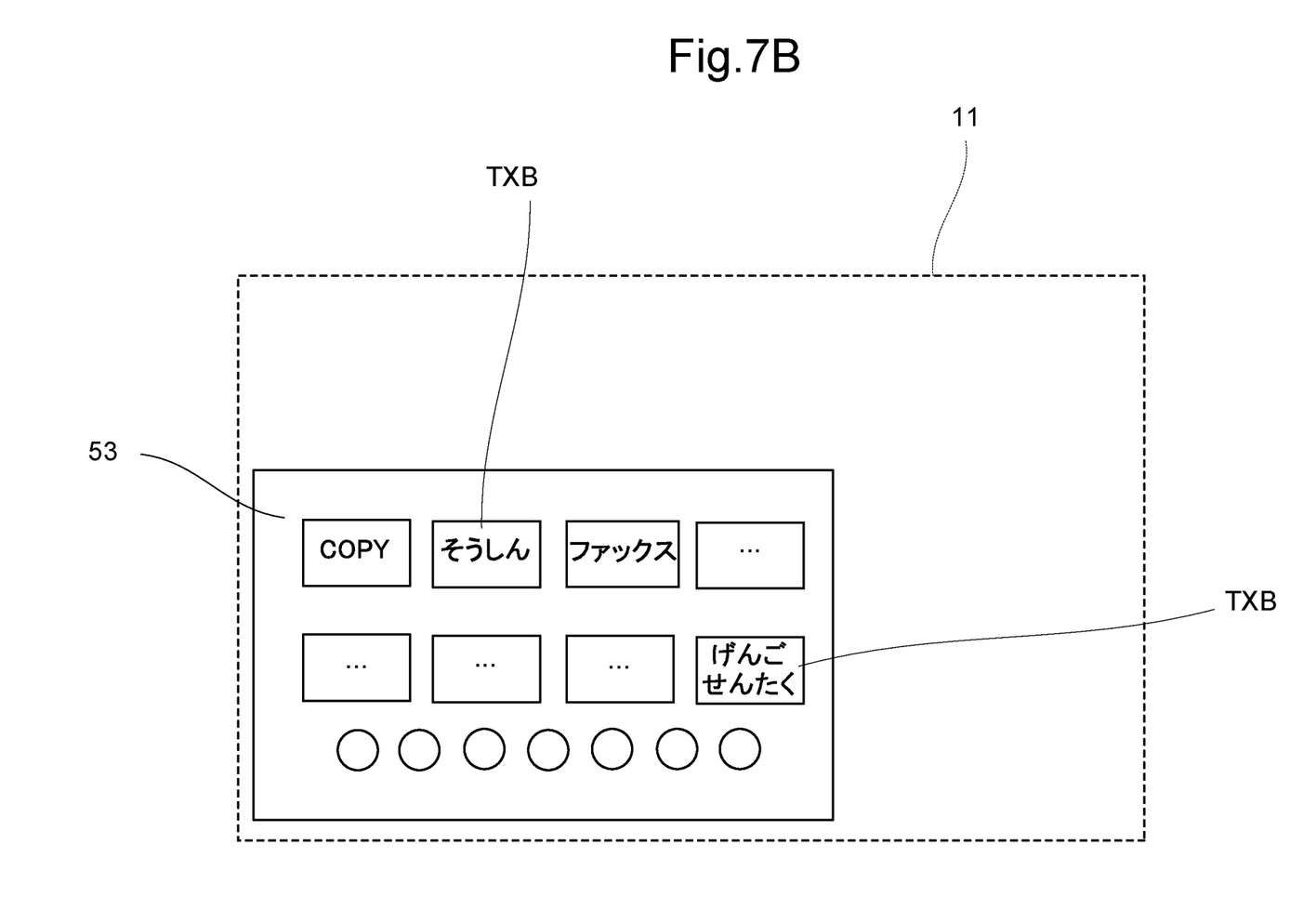
FIG. 7B is a schematic drawing showing an example of the smaller-sized input screen, on which kanji characters have been substituted with kana letters.

The controller 21 transmits the second screen data for the second input screen 53 generated as above, from the communication device 13 to the information processing apparatus 30 via the network (step S205).

In the information processing apparatus 30, when the communication device 33 receives the second screen data for the second input screen 53 (step S106), the controller 41 causes the display device 31 to display the second input screen 53, on the basis of the second screen data (step S107).

With the arrangement according to the second embodiment, even though the smaller-sized second input screen 53 is displayed on the display device 31 of the information processing apparatus 30, owing to the drop in communication speed between the image forming apparatus 10 and the information processing apparatus 30, the user can easily visually recognize the texts, since the texts are expressed by simple kana letters. If kanji characters were displayed on the second input screen 53, the kanji character of a complicated shape would also be displayed in the smaller size, which leads to impaired user-friendliness of the second input screen 53 because of the degraded visibility.

Here, it is not mandatory to substitute all the kanji characters with the kana letters. The kanji characters of a size equal to or larger than a predetermined character size in the first input screen 51 (e.g., 12 point or larger, considered to be recognizable by the user), which can be visually recognized by the user even in the smaller-sized second input screen 53, do not necessarily have to be substituted with kana letters. The controller 21 may leave those kanji characters equal to or larger than the predetermined character size unchanged in the second input screen 52, but may substitute the kanji characters smaller than the predetermined character size in the first input screen 51 with kana letters, and display the kana letters in the second input screen 52, to convert the second input screen 52 into the smaller-sized second input screen 53.

Likewise, the controller 21 may leave simple kanji characters having the number of strokes equal to or fewer than a predetermined number (e.g., 10 strokes) unchanged in the second input screen 52, since such characters can be visually recognized by the user even in the smaller-sized second input screen 53, but may substitute the kanji characters having the number of strokes larger than the predetermined number in the first input screen 51 with kana letters, and display the kana letters in the second input screen 52, to convert the second input screen 52 into the smaller-sized second input screen 53.

When the manager inputs an instruction to the second input screen 53 through the operation device 32, with the first input screen 51 displayed on the display device 11 of the image forming apparatus 10, and also the smaller-sized second input screen 53 corresponding to the first input screen 51 displayed on the display device 31 of the information processing apparatus 30, the controller 41 of the information processing apparatus 30 transmits the coordinate position on the second input screen 53 corresponding to the instruction inputted, from the communication device 33 to the image forming apparatus 10. In the image forming apparatus 10, when the communication device 13 receives the coordinate position on the second input screen 53 corresponding to the instruction, the controller 21 acquires the coordinate position on the second input screen 53 as the coordinate position on the first input screen 51, having the same coordinate system as that of the second input screen 53, and executes the operation identified from the coordinate position on the first input screen 51.

Variations

In a variation, the controller 21 changes the type of the kanji character to be substituted with kana letters, depending on the extent of the drop in communication speed CP. For example, the thresholds S, used for comparison with the ratio R of the communication speed CP to the average speed CPA, may be specified in a plurality of levels in advance, and the kanji characters of different sizes may be substituted with kana letters, depending on which of the thresholds S exceeds the ratio R. For example, it may be arranged such that the kanji characters of a larger size are substituted with the kana letters, as the level of the threshold S becomes lower, and the controller 21 may substitute the kanji characters of a larger size with the kana letters, as the level of the threshold S exceeding the ratio R becomes lower.

For the purpose of the above, the data table in which the text sizes are registered, in addition to the icons, keys, and texts constituting the first input screen, is stored in advance in the storage device 18 of the image forming apparatus 10, with respect to each type of the first input screen. In this data table, the lower the level of the threshold S is, the larger character sizes are associated therewith.

When the ratio R of the communication speed CP to the average speed CPA is exceeded by one of the thresholds S of the plurality of levels, the controller 21 of the image forming apparatus 10 looks up the mentioned data table, to read out the specified character size associated with the threshold S exceeding the ratio R, extracts the text TXA of the character size smaller than the specified size, from the first input screen displayed on the display device 11, and acquires the text TXB associated with the extracted text TXA from the text table DT, to generate the second screen data for the second input screen of the predetermined smaller size, upon substituting the text TXA in the first input screen with the text TXB.

Alternatively, the thresholds S for comparison with the ratio R of the communication speed CP to the average speed CPA may be specified in a plurality of levels in advance, and the controller 21 may substitute the kanji character having a fewer number of strokes with the kana letters, when a threshold S of a lower level exceeds the ratio R.

For the purpose of the above, the data table in which the number of strokes of the characters in the text are registered, in addition to the icons, keys, and texts constituting the first input screen, is stored in advance in the storage device 18 of the image forming apparatus 10, with respect to each type of the first input screen. In this data table, the lower the level of the threshold S is, the fewer number of strokes are associated therewith.

When the ratio R of the communication speed CP to the average speed CPA is exceeded by one of the thresholds S of the plurality of levels, the controller 21 of the image forming apparatus 10 looks up the mentioned data table, to read out the specified number of strokes associated with the threshold S exceeding the ratio R, extracts the text containing the kanji characters having a larger number of strokes than the specified number, from the first input screen displayed on the display device 11, and acquires the text TXB associated with the extracted text TXA from the text table DT, to generate the second screen data for the second input screen of the predetermined smaller size, upon substituting the text TXA in the first input screen with the text TXB.

Although the image forming apparatus exemplifies the electronic apparatus in the foregoing embodiments, the disclosure is also applicable to different types of electronic apparatuses, such as a medical apparatus and a ticket vendor. Likewise, although the personal computer exemplifies the information processing apparatus, the disclosure is also applicable to different types of information processing apparatuses, such as a mobile terminal device.

The configurations and arrangements according to the foregoing embodiments and variations, described with reference to FIG. 1 to FIG. 7B, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. A remote management system comprising:
an information processing apparatus; and
an electronic apparatus connected to the information processing apparatus via a network,
wherein the electronic apparatus includes:
a first display device;
a first control device including a first processor, and configured to act, when the first processor executes a control program, as a first controller that causes the first display device to display a first input screen for inputting a first instruction related to control of the electronic apparatus; and
a first communication device that performs data communication with the information processing apparatus, via the network,
the first controller transmits the first input screen or a second input screen from the first communication device to the information processing apparatus, the second input screen being generated by reducing a data amount of the first input screen, and executes, upon receipt of the first instruction with respect to the first input screen or the second input screen transmitted from the information processing apparatus, through the first communication device, an operation according to the first instruction,
the information processing apparatus includes:
a second display device;
a second communication device that performs data communication with the electronic apparatus, via the network;
an operation device to be operated by a manager; and
a second control device including a second processor, and configured to act, when the second processor executes an operation control program, as a second controller that causes, when the second communication device receives the first input screen or the second input screen transmitted from the electronic apparatus, the second display device to display the first input screen or the second input screen received, and, when the first instruction with respect to the first input screen or the second input screen is inputted through the operation device, transmits from the second communication device to the electronic apparatus, the first instruction inputted,
the second controller detects communication speed between the information processing apparatus and the electronic apparatus, and transmits, when the detected communication speed drops to a predetermined level, a second instruction for reducing the data amount of the first input screen, from the second communication device to the electronic apparatus, and transmits, when the detected communication speed is not below the predetermined level, a third instruction for maintaining the data amount of the first input screen, from the second communication device to the electronic apparatus,
the first controller of the electronic apparatus reduces the data amount of the first input screen displayed on the first display device to a predetermined amount, when the first communication device receives the second instruction, and transmits the second input screen having the reduced data amount, from the first communication device to the information processing apparatus, and when the first communication device receives the third instruction, transmits the first input screen displayed on the first display device, from the first communication device to the information processing apparatus without reducing the data amount of the first input screen,
the first controller of the electronic apparatus reduces the data amount of the first input screen, by reducing a data amount of image data representing the first input screen to a predetermined level by reducing a size of the first input screen to a predetermined size, and
the first controller of the electronic apparatus substitutes a kanji character contained in the first input screen with kana letters, when reducing the data amount of the image data representing the first input screen.

2. The remote management system according to claim 1, wherein the first controller of the electronic apparatus substitutes a kanji character contained in the first input screen, and having a size smaller than a predetermined character size, with the kana letters.

3. A remote management system comprising:
an information processing apparatus; and
an electronic apparatus connected to the information processing apparatus via a network,
wherein the electronic apparatus includes:
a first display device;
a first control device including a first processor, and configured to act, when the first processor executes a control program, as a first controller that causes the first display device to display a first input screen for inputting a first instruction related to control of the electronic apparatus; and
a first communication device that performs data communication with the information processing apparatus, via the network,
the first controller transmits the first input screen from the first communication device to the information processing apparatus, and executes, upon receipt of the first instruction with respect to the first input screen transmitted from the information processing apparatus, through the first communication device, an operation according to the first instruction,
the information processing apparatus includes:
a second display device;
a second communication device that performs data communication with the electronic apparatus, via the network;
an operation device to be operated by a manager; and a second control device including a second processor, and configured to act, when the second processor executes an operation control program, as a second controller that causes, when the second communication device receives the first input screen transmitted from the electronic apparatus, the second display device to display the first input screen received, and, when the first instruction with respect to the first input screen is inputted through the operation device, transmits from the second communication device to the electronic apparatus, the first instruction inputted, the second controller detects communication speed between the information processing apparatus and the electronic apparatus, and transmits, when the detected communication speed drops to a predetermined level, a second instruction for reducing a data amount of the first input screen, from the second communication device to the electronic apparatus, the first controller of the electronic apparatus reduces the data amount of the first input screen displayed on the first display device to a predetermined amount, when the first communication device receives the second instruction, and transmits a second input screen having the reduced data amount, from the first communication device to the information processing apparatus, the second controller of the information processing apparatus causes, when the second communication device receives the second input screen transmitted from the electronic apparatus, the second display device to display the second input screen received, the first controller of the electronic apparatus reduces the data amount of the first input screen, by reducing a data amount of image data representing the first input screen, to a predetermined level, the first controller of the electronic apparatus substitutes a kanji character contained in the first input screen with kana letters, when reducing the data amount of the image data representing the first input screen, the first controller of the electronic apparatus substitutes a kanji character contained in the first input screen, and having a size smaller than a predetermined character size, with the kana letters, and the first controller of the electronic apparatus selects one of a plurality of predetermined character sizes, depending on an extent of drop in the communication speed, and substitutes a kanji character having a size smaller than the predetermined character size, with the kana letters.

4. The remote management system according to claim 3, wherein the first controller of the electronic apparatus reduces the data amount of the first input screen, by converting the first input screen from a color image to a monochrome image.

5. The remote management system according to claim 3, wherein the first controller of the electronic apparatus reduces the data amount of the first input screen, by reducing a size of the first input screen to a predetermined size.

6. The remote management system according to claim 3, wherein the electronic apparatus is an image forming apparatus.

7. The remote management system according to claim 3, wherein the second controller transmits a third instruction for maintaining the data amount of the first input screen from the second communication device to the electronic apparatus, when the detected communication speed is not below a predetermined level, and the first controller of the electronic apparatus transmits, when the first communication device receives the third instruction, the first input screen displayed on the first display device, from the first communication device to the information processing apparatus.

8. A remote management system comprising:
an information processing apparatus; and
an electronic apparatus connected to the information processing apparatus via a network,
wherein the electronic apparatus includes:
a first display device;
a first control device including a first processor, and configured to act, when the first processor executes a control program, as a first controller that causes the first display device to display a first input screen for inputting a first instruction related to control of the electronic apparatus; and
a first communication device that performs data communication with the information processing apparatus, via the network, the first controller transmits the first input screen from the first communication device to the information processing apparatus, and executes, upon receipt of the first instruction with respect to the first input screen transmitted from the information processing apparatus, through the first communication device, an operation according to the first instruction, the information processing apparatus includes:
a second display device;
a second communication device that performs data communication with the electronic apparatus, via the network;
an operation device to be operated by a manager; and
a second control device including a second processor, and configured to act, when the second processor executes an operation control program, as a second controller that causes, when the second communication device receives the first input screen transmitted from the electronic apparatus, the second display device to display the first input screen received, and, when the first instruction with respect to the first input screen is inputted through the operation device, transmits from the second communication device to the electronic apparatus, the first instruction inputted, the second controller detects communication speed between the information processing apparatus and the electronic apparatus, and transmits, when the detected communication speed drops to a predetermined level, a second instruction for reducing a data amount of the first input screen, from the second communication device to the electronic apparatus, the first controller of the electronic apparatus reduces the data amount of the first input screen displayed on the first display device to a predetermined amount, when the first communication device receives the second instruction, and transmits a second input screen having the reduced data amount, from the first communication device to the information processing apparatus, the second controller of the information processing apparatus causes, when the second communication device receives the second input screen transmitted from the electronic apparatus, the second display device to display the second input screen received, the first controller of the electronic apparatus reduces the data amount of the first input screen, by reducing a data amount of image data representing the first input screen, to a predetermined level, the first controller of the electronic apparatus substitutes a kanji character contained in the first input screen with kana letters, when reducing the data amount of the image data representing the first input screen, and the first controller of the electronic apparatus substitutes a kanji character contained in the first input screen, and having a larger number of strokes than a predetermined number of strokes, with the kana letters.

9. The remote management system according to claim 8, wherein the first controller of the electronic apparatus selects one of a plurality of predetermined number of strokes, depending on an extent of drop in the communication speed, and substitutes a kanji character having a larger number of strokes than the predetermined number of strokes, with the kana letters.

* * * * *